(No Model.)

J. D. PADGITT.
GIRTH RIGGING FOR SIDE SADDLES.

No. 542,373. Patented July 9, 1895.

WITNESSES
W. J. S. Duvall
T. J. Keating.

INVENTOR:
Jesse D. Padgitt.
By W. S. Duvall, Attorney.

UNITED STATES PATENT OFFICE.

JESSE D. PADGITT, OF DALLAS, TEXAS, ASSIGNOR TO PADGITT BROTHERS, OF SAME PLACE.

GIRTH-RIGGING FOR SIDE-SADDLES.

SPECIFICATION forming part of Letters Patent No. 542,373, dated July 9, 1895.

Application filed April 23, 1895. Serial No. 546,906. (No model.)

*To all whom it may concern:*

Be it known that I, JESSE D. PADGITT, a citizen of the United States, residing at Dallas, in the county of Dallas and State of Texas, have invented certain new and useful Improvements in Girth-Rigging for Side-Saddles; and I do hereby declare the following to be a full, clear, and exact description of the invention, such as will enable others skilled in the art to which it appertains to make and use the same.

My invention relates to improvements in side-saddles, the objects in view being to produce a side-saddle wherein is employed an improved girth-rigging, the same being so arranged as to be adapted to the peculiarities of a saddle of this class, whereby the same will be seated more securely upon the back of the horse, and whereby the saddle will be secured by the rigging both fore and aft, so that motion independent of that of the horse is wholly avoided.

With these objects in view my invention consists in extending the saddle-tree so as to produce shoulders, the same underlying the saddle-seat at it its front and in supporting upon its shoulders and also upon the tree in rear of the cantle-girth suspension-straps that are continuous.

Figure 1:
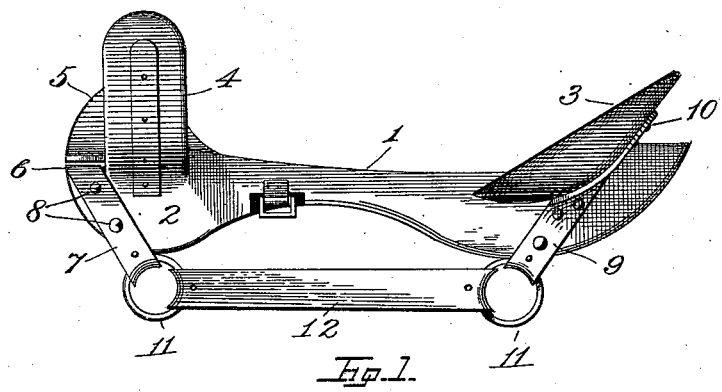
Figure 2:
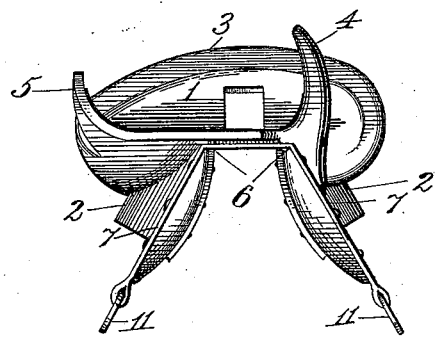

Referring to the drawings, Figure 1 is the side elevation of side-saddle constructed in accordance with my invention. Fig. 2 is a front elevation of the same.

Like numerals of reference indicate like parts in all the figures of the drawings.

Before describing in detail my invention I deem it proper to state that the same is applicable only to that class of saddles known as side-saddles, for the reason, as will hereinafter appear, that such a rigging could not be applied to a man's saddle, as the straps for suspending the girth would contact with the withers of the horse.

I am aware that straps somewhat similar in appearance to mine have been employed on men's saddles, but in all such instances there was no provision of a support for the same in a form of an extension of the tree, but the straps were either supported independent of the tree or else upon the horn of the pommel. It will be seen from this that while my invention is not applicable, as before stated, to men's saddles, neither are the straps in the instances mentioned applicable to a side-saddle without a change in the construction of said side-saddle, such as I will now proceed to describe.

1 designates a saddle-seat; 2, the saddle-tree; 3, the cantle; 4, the horn or pommel; 5, the curved leg-support opposite the same. The tree at its front end extends before the pommel or horn 4, producing a pair of horizontal transversal opposite shoulders 6, from which the curved rest 5 of the seat projects, as clearly shown. Arranged upon the shoulders 6 is the intermediate portion of a suspension-strap 7, the same being riveted at a number of points—as, for instance, at 8 to the tree 2. A similar strap 9 is arranged flatly against the rear bow or cantle of the saddle, being riveted thereto at intervals, as indicated at 10, and beyond the ends of the cantle is given a quarter-twist or turned so as to lie flatly upon the sides of the tree to which it is riveted. In the lower ends of the straps 7 and 9 are arranged rings 11, and these are connected by a longitudinal girth-rigging connecting-strap 12. The double girth employed in ladies' saddles, it will be understood, is connected to the rings 11. This completes the construction of my improved side-saddle, and it will be seen that a most convenient means has been provided for securing the saddle at both the front and rear extremities, so that all rocking of the same is avoided. By arranging the front strap on the shoulders 6, which are extended from the tree and which lie directly under the projecting seat, instead of in advance thereof, it will be seen that the suspension-straps are arranged with particular reference to the disposition of the weight of the occupant in a side-saddle, which, as is well known, varies from the disposition of the same in men's saddles.

Having described my invention, what I claim is—

1. The side-saddle having its tree extended at its front end transversely opposite to form shoulders 6, in advance of the pommel, and below the curved rest 5 of the saddle seat, combined with the front and rear straps 7 and 9 arranged on the shoulders and tree in rear of the cantle; the rings 11, and connecting strap 12, substantially as specified.

2. The improved saddle having its tree provided with the extension or shoulders 6; superimposed curved rest 5, and the cantle 3, combined with the strap 7, resting on shoulders 6 and depending therefrom and riveted to the extension; the strap 9 arranged flatly against the rear side of the cantle and riveted thereto and given a quarter twist beyond the ends of the cantle and below the same riveted to the tree, the rings 11 in the ends of the straps 7 and 9, and the connecting-strap 12, substantially as specified.

In testimony whereof I affix my signature in presence of two witnesses.

JESSE D. PADGITT.

Witnesses:
  N. W. GODBOLD,
  A. W. RUSSELL.